United States Patent
Yamazaki

(10) Patent No.: US 7,173,521 B2
(45) Date of Patent: Feb. 6, 2007

(54) TIRE AIR PRESSURE WARNING SYSTEM AND METHOD FOR WARNING AGAINST TIRE AIR PRESSURE

(75) Inventor: Toshihiko Yamazaki, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 150 days.

(21) Appl. No.: 11/065,460

(22) Filed: Feb. 25, 2005

(65) Prior Publication Data

US 2005/0195072 A1 Sep. 8, 2005

(30) Foreign Application Priority Data

Mar. 4, 2004 (JP) ............... 2004-060307

(51) Int. Cl.
- B60C 23/00 (2006.01)
- B60C 23/02 (2006.01)
- G08B 1/08 (2006.01)
- B60R 25/10 (2006.01)

(52) U.S. Cl. .................. 340/442; 340/443; 340/444; 340/445; 340/446; 340/447; 340/539.1; 340/539.22; 340/539.23; 340/426.18; 340/426.23; 73/146.2; 73/146.3; 73/146.4; 73/146.5

(58) Field of Classification Search ............... 340/442, 340/443, 444, 445, 446, 447, 539.1, 539.22, 340/539.23, 426.18, 426.23; 73/146.2, 146.3, 73/146.4

See application file for complete search history.

(56) References Cited

U.S. PATENT DOCUMENTS

| | | | |
|---|---|---|---|
| 4,398,172 A | * | 8/1983 | Carroll et al. ............ 340/942 |
| 6,441,732 B1 | * | 8/2002 | Laitsaari et al. ......... 340/539.1 |
| 6,535,116 B1 | * | 3/2003 | Zhou .......................... 340/447 |
| 6,650,236 B2 | * | 11/2003 | Ghabra et al. ............. 340/447 |
| 6,937,144 B2 | * | 8/2005 | Drake et al. ............... 340/447 |

FOREIGN PATENT DOCUMENTS

| | | |
|---|---|---|
| JP | 2716335 B2 | 11/1997 |
| JP | 11-20427 A | 1/1999 |
| JP | 11-321254 A | 11/1999 |

* cited by examiner

*Primary Examiner*—Daniel Wu
*Assistant Examiner*—Lam Pham
(74) *Attorney, Agent, or Firm*—Birch, Stewart, Kolasch & Birch, LLP

(57) ABSTRACT

To issue a warning against an improper (a lowered) air pressure in accordance with a vehicle state and driver's presence/absence, the warning system includes air pressure measuring means for measuring an air pressure of a tire of a vehicle; air pressure judging means for judging whether or not the air pressure is proper; warning issuing means for issuing, if a result of the judgment is negative, a warning; and driver on-board judging means for judging whether or not a driver is on board the vehicle; and driver detecting means for detecting whether or not the driver is in the proximity to the vehicle. If the results of the judgments by the air pressure judging means and the driver on-board judging means are negative and a result of the detection by the driver detecting means is positive, the warning issuing means issues the warning outside the vehicle.

19 Claims, 4 Drawing Sheets

TIRE AIR PRESSURE WARNING SYSTEM AND METHOD FOR WARNING AGAINST TIRE AIR PRESSURE

BACKGROUND OF THE INVENTION

1. Field of the Invention:

The present invention relates to a tire air pressure warning system for detecting lowering in pressure of a tire and issuing a warning about the pressure lowering.

2. Description of the Related Art:

In order to measure an air pressure inside a tire (hereinafter, simply called tire air pressure or air pressure) of a vehicle such as an automobile, there are hitherto provided an apparatus including a tire air pressure gauge disposed at a wheel and a radio transmitter for transmitting an air pressure signal including a result of measurement carried out by the tire air pressure gauge, and a receiver for receiving the air pressure signal (disclosed in, for example, Japanese Patent Application KOKAI (Laid-Open) Publication No. HEI 11-20427, HEI 11-321254, Japanese Patent Publication No. 2716335).

Such an apparatus arranges the tire air pressure gauge and the radio transmitter inside a wheel, and measured tire air pressure data, which is measured by the tire air pressure gauge, is transmitted in the form of a signal by the radio transmitter as required. On the other hand, the receiver is disposed on the bodywork portion of the vehicle and receives the measured air pressure data transmitted by the radio transmitter so that the tire air pressure can be monitored.

It is convenient for the above technique that the timing for measurement of a tire air pressure or for transmitting a radio signal can be controlled from the bodywork portion so that information of the tire air pressure such as a measured air pressure can be obtained as required. But, in order to control operation performed by a tire air pressure gauge and a radio transmitter placed inside a wheel from outside and other than the wheel, the apparatus however requires another receiver disposed inside the wheel for receiving a control signal. The narrow space inside the wheel (inside the tire) forces a receiver to be small in size and light in weight in order to be accommodated inside the wheel, resulting in increased costs and a complex manufacturing process. Cable connection between a wheel and a bodywork portion is not practically realized unless a slip ring or another part is not installed at the axis of the wheel.

For this reason, in a general tire air pressure measurement apparatus, a tire air pressure gauge and a radio transmitter, which are installed at a wheel, is predetermined to periodically operate at regular intervals without requiring control from the bodywork portion. For example, the tire air pressure gauge measures a tire air pressure once an hour when the vehicle is parked and once a minute when the vehicle is traveling, and the radio transmitter transmits a radio signal including the measured air pressure data to the surroundings.

Further, the apparatus generally determines a threshold value with hysteresis for judgment as to whether or not a warning is required. In other words, a threshold value (a warning onset threshold value) at which a warning is started is set different in value from a threshold value (a warning termination threshold value) at which the warning is terminated. Specifically, when a warning is not issued, a tire air pressure lower than the warning onset threshold value causes a warning to be issued; and while a warning is issued, a tire pressure higher than the warning onset threshold value does not cause the warning to be cancelled but a tire pressure higher than the warning termination threshold value, which is higher than the warning onset threshold value, causes the current warning to be cancelled.

If a warning against a tire air pressure is judged on the basis of a single warning threshold value, a result of judgment made on a tire air pressure around the threshold value is not stable. Conversely, a hysteresis area between the warning onset threshold value and the warning termination threshold value can obtain a stable judgment result.

A warning issued in an apparatus for measuring a tire air pressure described above is exemplified by making a noise with the horn, by lighting an external lighting device such as the headlamps and/or the flashers, by lighting an interior lighting device such as the interior lamp, and/or by using a buzzer and an equipped warning. In any case, a preferable warning is issued in accordance with the state of the vehicle. Namely, when the driver is inside the vehicle while the vehicle is traveling or is stopped, a preferable warning is issued inside the vehicle using the above buzzer or lamp exemplified by the interior lamp; when the driver is not on board the vehicle while the vehicle is stopped, a preferable warning is issued outside the vehicle using the horn, the headlamp, the flashers and/or other device.

For vehicles that also have a so-called keyless entry system in addition to an apparatus for measuring tire air pressure, another technique proposes that signals for the system and the apparatus utilize the same radio frequency and share the same receiver so that a distinct warning is issued inside or outside the vehicle in accordance with an activating state of the door locking mechanism (disclosed in, for example, the above-mentioned Japanese Patent Publication No. 2716335 hereinafter also called patent reference #3).

In patent reference #3, while a vehicle is traveling or if the vehicle does not receive neither door lock signal nor door unlocking signal during stopping, detection of an improper tire air pressure issues a warning inside the vehicle; and while a vehicle is stopped after the doors are unlocked in response to receipt of a door-unlock signal, opening of the doors without receiving a door-unlock signal or detection of an improper tire air pressure causes a warning to be issued outside the vehicle.

Although a tire air pressure gauge does not detect an improper tire air pressure at the time when a vehicle is stopped for parking, the tire air pressure measuring apparatus may detect an improper tire pressure (a lowered tire air pressure) which is caused by variation in a tire pressure due to a nail piercing the tire or other reason while the vehicle is parked, i.e., while a switch (the main power switch exemplified by the ignition switch) is off, the doors are locked and the driver is absent from the inside of the vehicle.

In the case of such a variation in tire air pressure, the tire air pressure gauge measures tire air pressure and the radio transmitter issues a radio signal including information of the measured pressure data even when the IG switch is in the off state because the conventional tire air pressure measuring apparatus is set to periodically operate at regular intervals irrespective of an on/off state of the IG switch. Upon receipt of the measured air pressure data included in the issued radio signal by the receiver, a judgment is made for the measured air pressure and, if the tire pressure is lowered to a lower level than the warning onset threshold value, the judgment concludes that a warning should be issued although a warning is not actually issued. After that, when the driver unlocks the doors, boards the vehicle and turns the IG switch on, a warning is issued.

As mentioned above, the conventional tire air pressure measuring apparatus does not notify a driver of an improper tire air pressure (a lowered tire air pressure) until the driver boards the vehicle and turns the IG switch on. Therefore, the driver has to get out the vehicle in order to check the tire with improper air pressure and carry out rectification (e.g., refill the tire with air or replacing the tire with a spare tire), being loaded with increasing labor.

In a technique disclosed in patent reference #3, when a vehicle is parked and the driver is not on board the vehicle, the vehicle performs an operation in an alert mode for prevention of car theft. Thereby, when the tire air pressure gauge detects an improper tire air pressure (a lowered tire air pressure) while the vehicle is parked, the receiver subsequently receives a measured air pressure signal and the apparatus judges that a warning should be issued, a warning is automatically issued outside the vehicle.

In other words, since, in the technique disclosed in Patent reference #3 or the like, since the vehicle being parked also issues a warning for crime prevention, the vehicle issues a warning irrespective of the presence of the driver inside and around the vehicle even when the driver is not in proximity to the vehicle and is therefore not aware of the warning. For this reason, a variation in tire air pressure caused by a reason other than theft or mischief issues a warning indiscriminately and the warning may be a noise.

SUMMARY OF THE INVENTION

With the foregoing problems in view, the object of the present invention is to provide a tire air pressure warning system that can issue a warning against unsuitable (lowering) tire air pressure in accordance with a state of a vehicle and with the presence/absence of a driver.

In order to attain the above object, as a generic feature of the present invention, there is provided a system for warning against a tire air pressure comprising: air pressure measuring means for measuring a tire air pressure of a tire of a vehicle; air pressure judging means for judging, on the basis of the tire air pressure measured by the air pressure measuring means, whether or not the tire air pressure is proper; warning issuing means for issuing, if a result of the judgment by the air pressure judging means is negative, a warning; driver on-board judging means for judging whether or not a driver is on board the vehicle; and driver detecting means for detecting whether or not the driver is in the proximity to the vehicle, if the result of the judgment by the air pressure judging means is negative, a result of the judgment by the driver on-board judging means is negative and a result of the detection by the driver detecting means is positive, the warning issuing means issues the warning outside the vehicle.

The warning issuing means issues a warning outside the vehicle if the air pressure judging means judges that the tire air pressure is improper, the driver on-board judging means judges that the driver is not on board the vehicle, and the driver detecting means detects proximity of the driver to the vehicle. A warning issued in accordance with a state of the vehicle and with presence/absence of the driver can be properly recognized by the driver. In other words, if the air pressure judging means detects an improper tire air pressure caused by a pressure variation during parking, the system does not ineffectively issue a warning if the driver is not in proximity to the vehicle but definitely issues a warning to the driver only when in proximity to the vehicle. Additionally, the driver can notice the warning prior to boarding the vehicle so that the driver can efficiently deal with the tire having an improper tire air pressure.

As a preferable feature, if the result of the judgment by the air pressure judging means is negative and the result of the judgment by the driver on-board judging means is positive, the warning issuing means may issue the warning inside the vehicle. Such a warning issued in accordance with a state of the vehicle and with presence/absence of the driver can be properly recognized by the driver.

As another preferable feature, the driver on-board judging means may judge that the driver is not on board the vehicle when a switch for traveling of the vehicle is off and may judge that the driver is on board the vehicle when the switch for traveling is on, so that it is possible to judge with certainty whether or not the driver is on board the vehicle.

Further, if the vehicle has a smart entry system, the driver on-board judging means preferably judges whether or not the driver is on board the vehicle on the basis of a signal issued from a mobile device having a function for signal issuing (i.e., on the basis of as to whether or not the mobile device is within a predetermined area of the driver's seat).

As an additional preferable feature, the air pressure measuring means may be provided for each tire or a wheel that supports each tire; the air pressure judging means may be arranged on a bodywork portion of the vehicle; and the air pressure measuring means may transmit a radio signal to the air pressure judging means to notify the tire air pressure that has been measured. With this preferable feature, it is possible to form a system small in size and light in weight and cable connection to the air pressure measuring means arranged at each tire or each wheel can be dispensable.

As a further preferable feature, the driver detecting means may detect proximity of the driver to the vehicle upon receipt of a radio signal issued by the driver so that it is possible to surely detect proximity of the driver to the vehicle.

As a still further preferable feature, the air pressure judging means may include air pressure receiving means for receiving the radio signal transmitted by the air pressure measuring means; and common receiving means may be shared by the air pressure receiving means and receiving means for receiving, in the driver detecting means, the radio signal issued by the driver whereupon it is possible to realize the present system at a low cost.

As a still further preferable feature, the vehicle may include a keyless entry system; and the driver detecting means may detect the proximity of the driver to the vehicle on the basis of an unlock signal used for the keyless entry system. Advantageously, proximity of the driver can be surely detected and the system for warning against a tire air pressure can be realized at a low cost if the vehicle already has the keyless entry system.

As a still further preferable feature, if the result of the judgment by the air pressure judging means is negative, a result of the judgment by the driver on-board judging means is negative and a result of the detection by the driver detecting means is positive on the basis of the unlock signal, the warning issuing means may issue the warning outside the vehicle and prevent the keyless entry system from unlocking the doors of the vehicle on the basis of the unlock signal; and upon completion of the issuing of the warning, the warning issuing means may neutralize the prevention the forbidding. With this feature, the driver can definitely recognize the tire having an improper air pressure.

As a still further preferable feature, the warning issued by the warning issuing means and a normal answerback to the unlock signal for the keyless entry system may be issued by common warning means; and the warning issued by the warning issuing means may be different in manner from the normal answerback to the unlock signal whereupon the driver can surely recognize detection of an improper tire air pressure when unlocking the doors.

As still another preferable feature, the air pressure measuring means may measure the tire air pressure at first intervals while the vehicle is traveling and measure the tire air pressure at second intervals longer than the first intervals while the vehicle is parked. As a result, measurement intervals in the air pressure detecting means are appropriately controlled so that it is possible to reduce energy consumption such as electricity consumption.

Assuming that the air pressure measuring means switches an interval of measurement between the first interval and the second interval on the basis of a state of a centrifugal switch, a tire air pressure may be measured at the first intervals during revolution of the tire (i.e., while the vehicle is traveling) and at the second intervals during halt of the tire (i.e., while the vehicle is stopping). Alternatively, the air pressure measuring means may measure a tire air pressure on the basis of an on/off state of a switch for traveling: an on state of the traveling switch, in which the vehicle is ready for traveling, causes the air pressure measuring means to measure a tire air pressure at the first intervals; and an off state of the traveling switch, in which the vehicle is not ready for traveling, causes the air pressure measurement means to measure a tire air pressure at the second intervals.

Other objects and further features of the present invention will be apparent from the following detailed description when read in conjunction with the accompanying drawings.

DESCRIPTION OF THE PREFERRED EMBODIMENTS

A preferred embodiment of the present invention will now be described with reference to the accompanying drawings.

(A) First Embodiment

Figure 1:
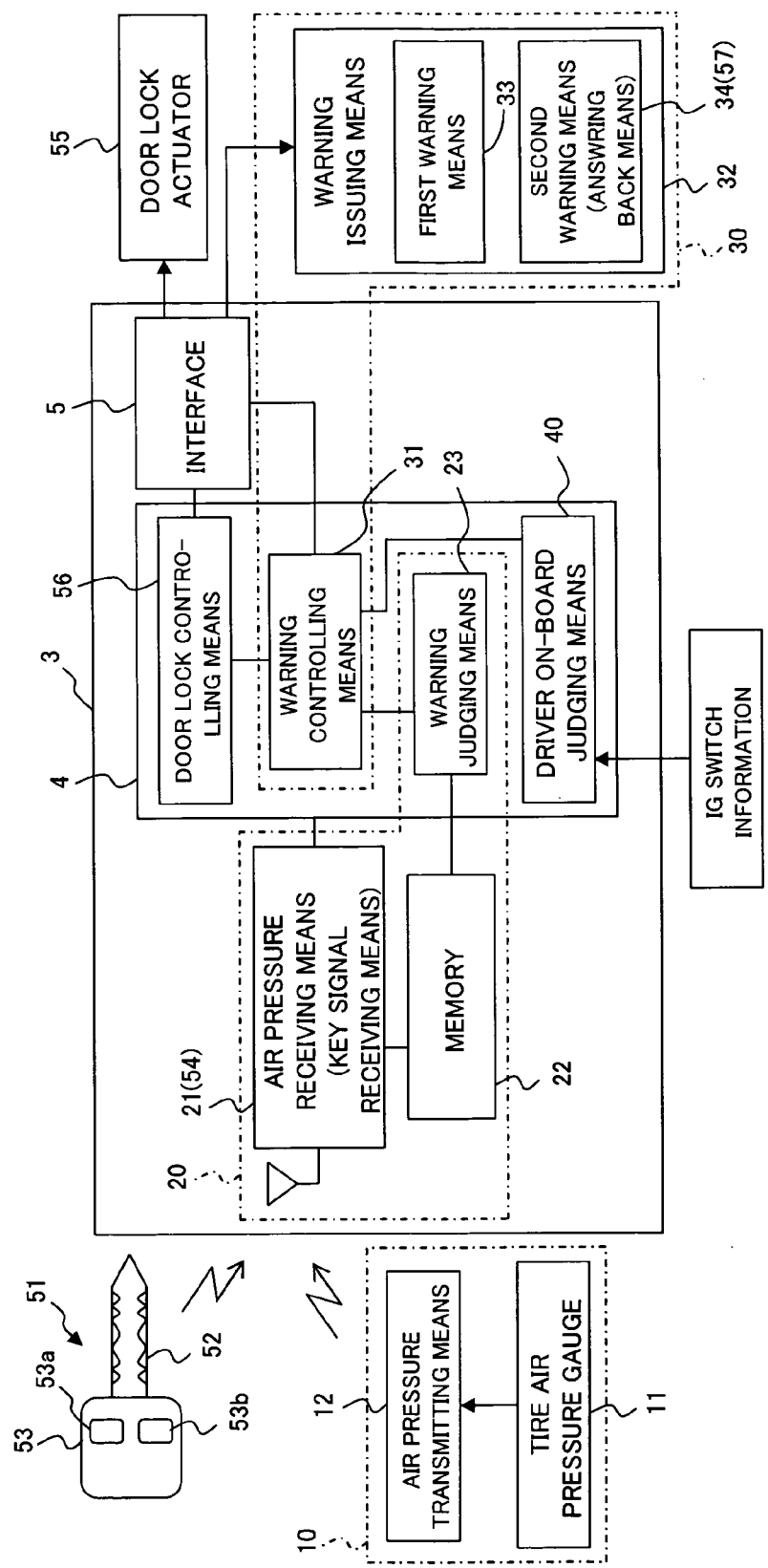
FIG. 1 is a block diagram schematically showing the entire system warning against a tire air pressure according to a first embodiment of the present invention.
Figure 2:
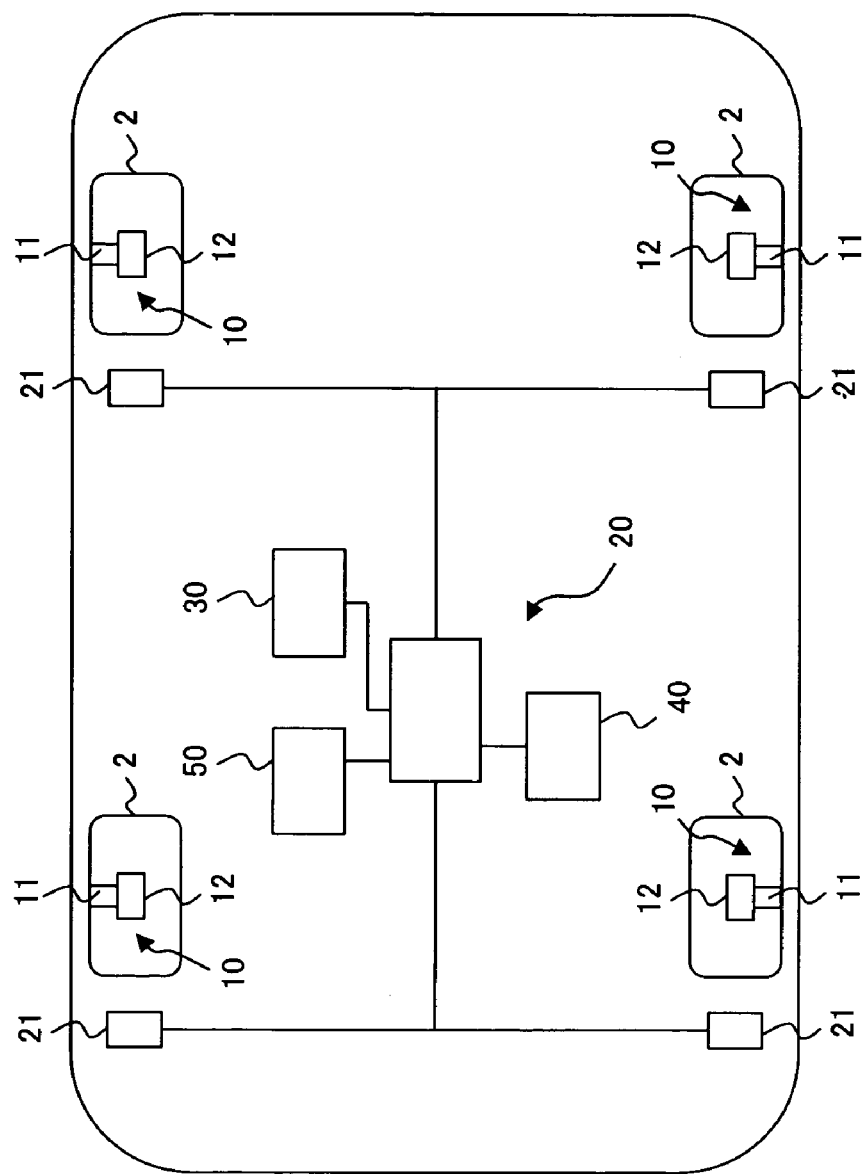
FIG. 2 is a diagram illustrating the entire structure of a vehicle to which the system for warning against a tire air pressure of the first embodiment is attached.
Figure 3:
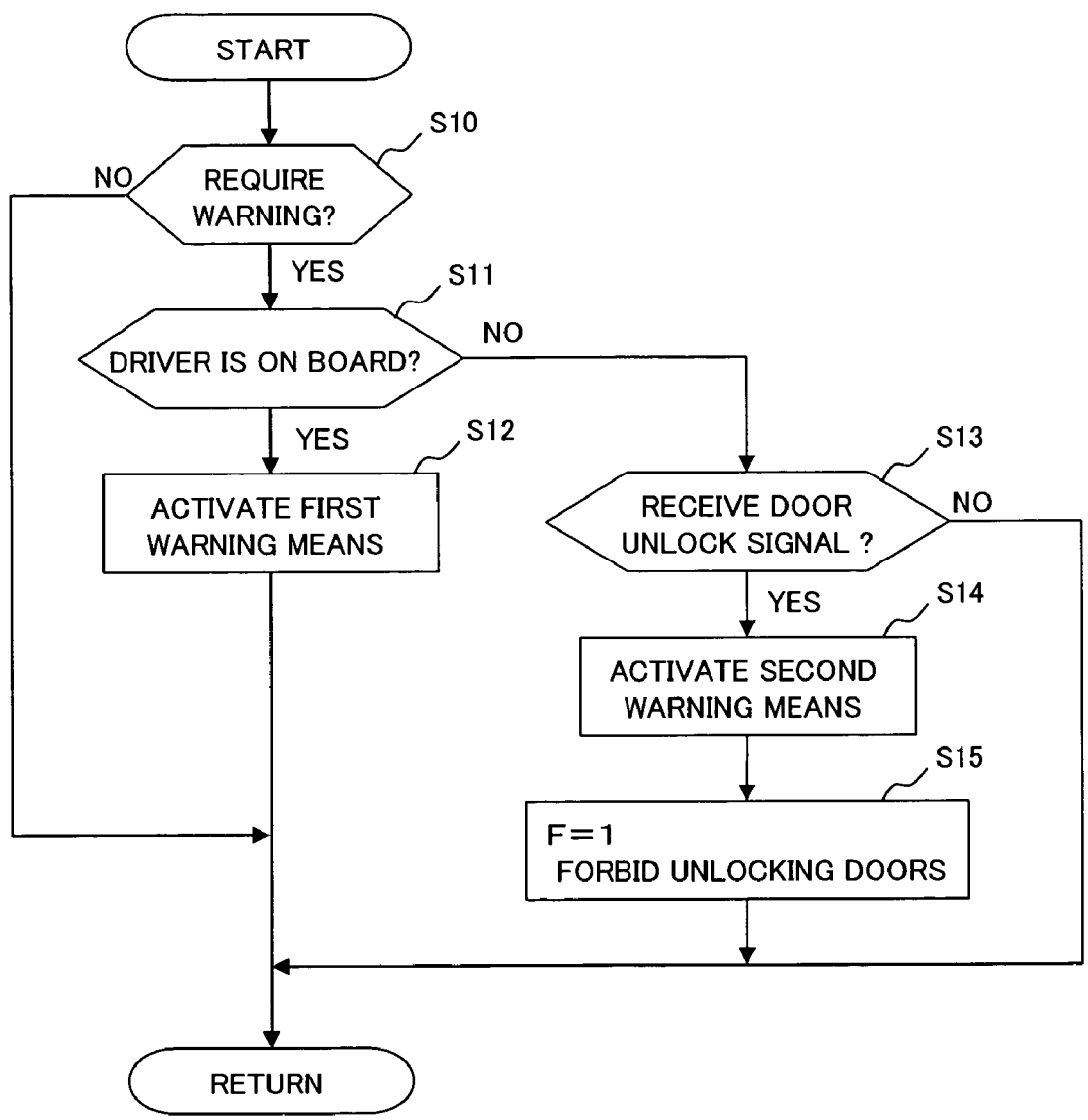
FIG. 3 is a flow diagram showing a succession of procedural steps of a controlling operation performed in the system for warning against a tire air pressure of the first embodiment.
Figure 4:
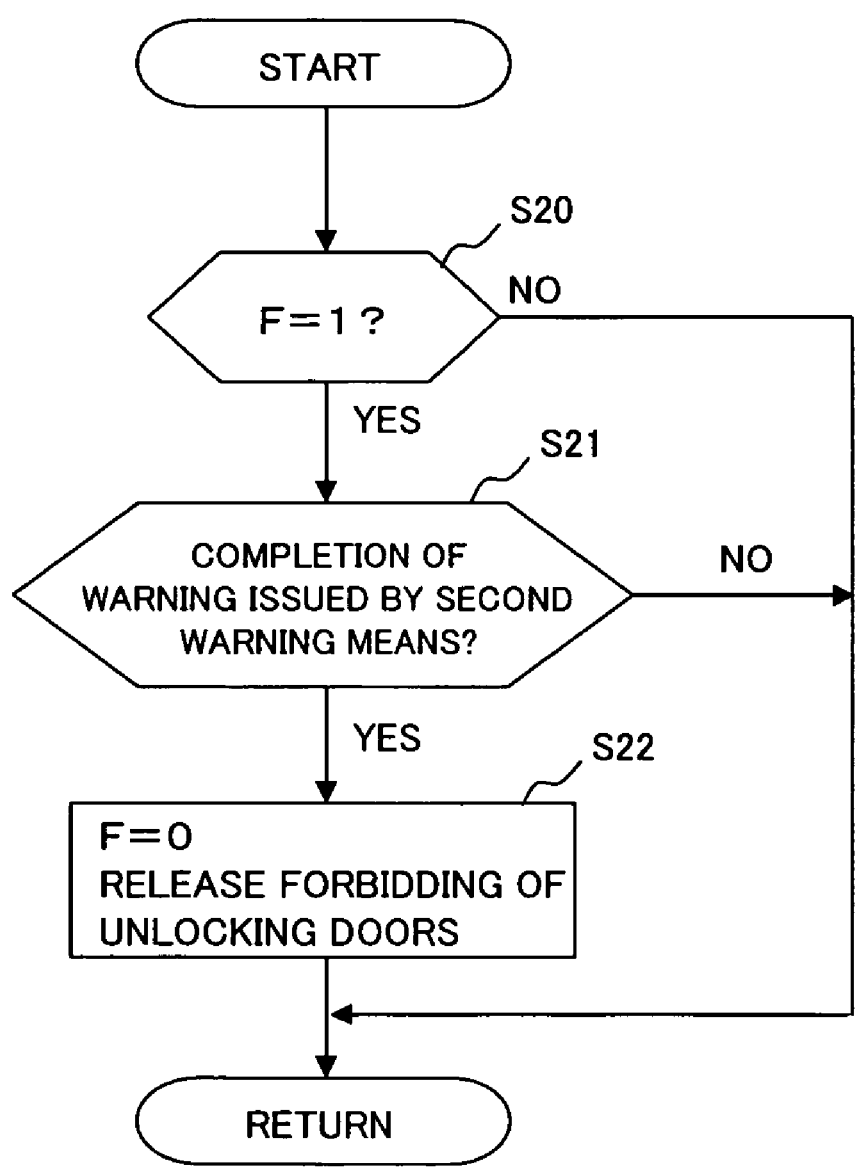
FIG. 4 is a flow diagram showing a succession of procedural steps of a controlling operation performed in the system for warning against a tire air pressure of the first embodiment.

FIGS. 1–4 show a system for warning against a tire air pressure (hereinafter also called the tire air pressure warning system) of the present invention. FIG. 1 shows the entire system; FIG. 2 shows the entire structure of a vehicle to which the system is attached; FIGS. 3 and 4 respectively show successions of procedural steps of controlling operations performed in the system. Throughout this description, the system is assumed to apply to an ordinary vehicle (which travels by means of an internal combustion engine).

As shown in FIGS. 1 and 2, the system for warning against a tire air pressure according to the first embodiment of the present invention includes air pressure measuring means 10, arranged inside each tire 2 of a vehicle 1 or a wheel (not shown) supporting each tire 2, for measuring a tire air pressure, air pressure judging means 20 for judging, on the basis of the result of measurement executed by the air pressure measuring means 10, whether or not the tire air pressure is proper, warning issuing means 30 for issuing a warning if the air pressure judging means 20 judges that the tire air pressure is improper, driver on-board judging means 40 for judging whether or not a driver is on board the vehicle 1, and driver detecting means 50 for detecting whether or not the driver is in the proximity of the vehicle 1.

The air pressure measuring means 10 includes a tire air pressure gauge 11 for measuring an air pressure of a tire and air pressure transmitting means 12 for transmitting data (hereinafter called measured pressure data) representing a measured tire air pressure which data is in the form of a radio signal (hereinafter also called an air pressure signal) to the air pressure judging means 20 arranged on the bodywork portion of the vehicle 1. Throughout this specification, the "bodywork portion" represents portions of the vehicle other than the tires and the wheels, namely, the bodywork portion represents the entire portion of the vehicle other than the wheels and the parts designated by reference number 2 in FIG. 2. The air pressure judging means 20 includes air pressure receiving means 21 for receiving the above radio signal, which is issued by the air pressure transmitting means 12 in the air pressure measuring means 10.

The tire air pressure gauge 11 and the air pressure transmitting means 12 are respectively identical to a conventional tire air pressure gauge and a conventional radio transmitter used in a conventional tire air pressure measuring unit previously described. In addition to the tire air pressure gauge 11 and the air pressure transmitting means 12, a battery and a centrifugal switch that are not however shown are arranged inside each tire. The tire air pressure gauge 11 and the air pressure transmitting means 12 respectively use the battery as a power source and thereby do not require control from the bodywork portion in order to operate independently from each unit arranged in the bodywork portion of the vehicle. The tire air pressure gauge 11 measures an air pressure of the tire at predetermined regular intervals. The air pressure transmitting means 12 radio-transmits the measured air pressure in the form of an air pressure signal to the surroundings.

The centrifugal switch is set on when rotation of the tire of the vehicle generates a centrifugal force (acceleration in the radial direction of the tire) (i.e., when the vehicle is traveling) and is conversely set off when the tire is halted (when the vehicle is parked or other state) The tire air pressure gauge 11 measures a tire air pressure at first intervals (in the illustrated example, once a minute) when the centrifugal switch is on and measures at second intervals (here, once an hour) when the centrifugal switch is off. The air pressure transmitting means 12 transmits an air pressure signal to the surroundings each time the tire air pressure gauge 11 carries out measurement.

As shown in FIG. 1, the first embodiment assumes that the vehicle adopts a so-called keyless entry system having a function for driver detecting means 50 for detecting proximity of the driver. Namely, the keyless entry system includes a remote controller (here, takes the form of an operation key also serving as the ignition key) 51 for issuing a radio signal to the vehicle (hereinafter also called a key signal) to lock and unlock the doors of the vehicle, key signal receiving means 54 for receiving the key signal issued by the operation key 51, door lock controlling means 56 for operating and controlling a door lock actuator 55 for activating a door lock mechanism in response to the radio signal received by the key signal receiving means 54 in order to lock/unlock the doors. The key signal receiving means 54 serves to function as the driver detecting means 50.

The keyless entry system used in the illustrated example includes answering back means 57 for notifying (answering back to) the surroundings (mainly the driver) of locking or unlocking doors. The answering back means 57 is the flashers (second warning means 34 that is to be described later) incorporated in the vehicle, and is controlled by the door lock controlling means 56 in synchronization with the control by the door lock actuator 55. The answering back means 57 flashes only once when the doors are locked; and flashes twice when the doors are unlocked.

Here, the key signal receiving means 54 and the door lock controlling means 56 are arranged in a receiver 3. In particular, the door lock controlling means 56 is disposed in an arithmetic unit (CPU) 4 that is arranged in the receiver 3. A signal for driving and controlling the door lock actuator 55 which signal is issued by the door lock controlling means 56, and a signal for operating the answering back means 57 are respectively transmitted to the door lock actuator 55 and the answering back means 57 through the interface 5 included in the receiver 3.

The operation key 51 also serves as the IG (Ignition Key—the engine key) of the vehicle and includes a key plate 52 for turning the IG switch (the main power source switch, the traveling switch) on when being inserted into the IG key cylinder and then being turned, and a key grip 53. The key grip 53 has a door locking switch 53a and a door unlocking switch 53b. Inside the key grip 53, there are disposed a built-in transmitter for radio-issuing an ID (identification) code in response to a press of the switch 53a or 53b and a door lock signal and a door unlock signal, in the form of radio signals (key signals), corresponding to switches 53a and 53b respectively.

In other words, when the key signal receiving means 54 receives a radio signal for locking or unlocking the doors issued in response to a press of the door locking switch 53a or the door unlocking switch 53b on the operation key 51 and the door lock controlling means 56 verifies the ID code included in the radio signal, the door lock controlling means 56 activates and controls the door lock actuator 55 in accordance with the door lock signal or the door unlock signal included in the radio signal so that the door mechanism locks or unlocks the doors. At that time, the door lock controlling means 56 also controls the answering back means 57 so as to activate in a manner corresponding to the locking or unlocking of the doors.

As described above, the key signal receiving means 54 of the keyless entry system serves as the driver detecting means 50 in the first embodiment. More specifically, when the key signal receiving means 54 receives a key signal issued in response to a press of the door locking switch 53a (or the door unlocking switch 53b) of the operation key 51 by a driver in proximity to the vehicle, the door lock controlling means 56 detects proximity of the driver to the vehicle.

As shown in FIG. 1, the air pressure judging means 20 includes air pressure receiving means 21 for receiving measured pressure data issued by the air pressure transmitting means 12, memory 22 for updating measured pressure data received by air pressure receiving means 21 each time receiving and for retaining the updated measured pressure data, and warning judging means 23 for judging, on the basis of the measured pressure data stored in the memory 22, whether or not a warning is required.

The warning judging means 23 determines a warning onset threshold value and a warning termination threshold value that are different in value, and judges that a warning is required when the measured pressure data falls short of the warning onset threshold value and that a warning is now unnecessary when measured pressure data which is subsequently received exceeds the warning termination threshold value. The measured pressure data received by the air pressure receiving means 21 is once stored in the memory 22, and the warning judging means 23 makes the above judgment with reference to the measured pressure data retained in the memory 22.

Also as shown in FIG. 1, the warning issuing means 30 includes warning controlling means 31 for controlling warning issuing means 32 that is to be described later on the basis of a result of judgment by the warning means 23 of the air pressure judging means 20, and the warning issuing means 32 for issuing a warning to the surroundings if the warning controlling means 31 judges that a warning is required.

The warning controlling means 31 controls the warning issuing means 32 based on the result of judgment by the warning judging means 23 and the result of judgment as to whether the driver is on board the vehicle about which judgment is made by later-described driver on-board judging means 40.

The warning issuing means 32 includes first warning means 33 for issuing a warning inside the vehicle and second warning means 34 for issuing a warning outside the vehicle. The first warning means 33 is exemplified by a lamp arranged on the instrument panel or the like easily visible from the driver's seat and/or a buzzer so that the driver on board the vehicle can definitely recognize the warning.

The second warning means 34 is exemplified by the horn, the headlamp and/or the flashers originally incorporated in the vehicle so that the driver outside and at the surroundings of the vehicle can definitely recognize the warning. In the illustrated example, the second warning means 34 takes the form of the flashers, which are common to the answering back means 57 described as above. For easy recognition of the driver, an answer in the keyless entry system which answer is issued by the answering back means 57 under control of the door lock controlling means 56 is different in manner from a warning issued by the second warning issuing means 34 under control of the warning controlling means 31, in the first embodiment. Here, the warning controlling means 31 flashes the flashers (the second warning issuing means 34) four times.

The driver on-board judging means 40 judges whether or not the driver is on board the vehicle on the basis of information of an on/off state of a switch used for traveling. In the illustrated example, the driver-on-board state is judged in accordance with on/off information (IG switch information) of the IG switch. In other words, on the basis of information as to whether or not the motive power source of the vehicle is in a state ready for operation, the driver-on-board state is ascertained on the assumption that the driver is on board the vehicle when the vehicle is in a state ready for traveling and that the driver is not on board when the vehicle is in a state not ready for traveling.

Information of the traveling switch is enough to show whether or not the motive power source of the vehicle is in a state ready for operation. Since the first embodiment assumes that the vehicle utilizes an internal combustion engine (an engine) as the motive power source, an on/off state of the engine switch can be a substitute for IG switch information. Further, if the vehicle is an electric car, information of a switch for traveling can be a state as to whether or not the motive power source (e.g., a battery) is connected to the driving mechanism in order to make the vehicle ready for traveling.

In this example, an on/off state of the traveling switch is switched by inserting the key plate 52 into the key cylinder and then turning the inserted key plate 52. But switching of the on/off state should by no means be limited to the above manner. Alternatively, the on/off state may be switched by a mere press of the traveling switch or by a transmitter, arranged at a predetermined position (within a predetermined area), for issuing a radio signal.

Further alternatively, the driver on-board judging means 40 may judge driver being on boarding the vehicle based on the result of detection using a sensor or another device, irrespective of an on/off state of the traveling switch, or if the vehicle accommodates a so-called smart entry system, may judge the driver's presence inside the vehicle based on a signal issued from a mobile device having a signal-transmission function (i.e., based on whether or not the mobile device is within a predetermined area of the driver's seat).

The air pressure receiving means 21, the memory 22, the warning judging means 23, the warning controlling means 31 and the driver on-board judging means 40 are arranged in the receiver 3 of the keyless entry system along with each section and means used for the keyless entry system. Namely, the air pressure receiving means 21 of the first embodiment is formed by common receiving means to the key signal receiving means 54. For this reason, a door lock signal and a door unlock signal issued by the operation key 51 and an air pressure signal issued by the air pressure transmitting means 12 utilize the same radio frequency.

The warning judging means 23, the warning controlling means 31, and the driver on-board judging means 40 are disposed in the arithmetic unit 4 included in the above receiver 3 for the keyless entry system. The memory 22 is arranged in the receiver 3 and is communicably connected to the air pressure receiving means 21 and the warning controlling means 31. The warning controlling means 31 controls the warning issuing means 32 through the interface 5.

Hereinafter, description is made as for a succession of procedural steps performed in the tire air pressure warning system (a tire air pressure warning method) of the first embodiment.

The present tire air pressure warning system operates irrespective of states of the IG switch and the engine switch as long as the power source of an on-board battery is connected to the system. In the tire air pressure warning system, the tire air pressure gauge 11 monitors variation in tire air pressure at first intervals or at the second intervals continuously. The warning judging means 23 and the warning controlling means 31 carry out arithmetic operations that are described later with reference to FIG. 3 at predetermined intervals.

Specifically, when the air pressure transmitting means 12 issues measured pressure data, which is a result of measurement performed by the tire air pressure gauge 11 at first or second intervals, each time measurement is performed and the air pressure receiving means 21 receives the issued pressure data, the warning judging means 23 converts the measured pressure data into a signal in a readable format and sends the signal to the memory 22. After that, the warning judging means 23 and the warning controlling means 31 execute a succession of arithmetic procedural steps as shown in flow diagram FIG. 3.

As shown in FIG. 3, first of all, the warning judging means 23 judges whether or not a warning is required by the warning issuing means 32 (i.e., whether or not a tire pressure is improper) on the basis of measured pressure data stored in the memory 22 in step S10. If the result of the judgment is negative, the warning controlling means 31 terminates the procedural steps.

Conversely if the result of the judgment by the warning judging means 23 is positive, the warning controlling means 31 shifts the procedural steps to step S12 if the driver on-board judging means 40 judges that the driver is on board the vehicle on the basis of the state of the traveling switch (here information of the IG switch) at step S11. Consequently, the warning controlling means 31 controls the first warning issuing means 33 of the warning issuing means 32 so that a warning is issued inside the vehicle and the procedural steps terminate upon completion of the warning.

On the other hand, if the driver on-board judging means 40 judges that the driver is not on board the vehicle, the procedural steps proceed to step S13. On the basis of the result of detection of proximity of the driver which detection is performed by the keyless entry system serving as the driver detecting means 50, in other words on the basis of information as to whether or not the key signal receiving means 54 has received a door unlock signal issued by the operation key 51 which information is obtained from the door lock controlling means 56, if a door unlock signal has not been received (i.e., if the driver is not in proximity to the vehicle), the warning controlling means 31 does not cause the warning issuing means 32 to issue a warning and terminates the procedural steps.

Conversely, if a door unlock signal is received (i.e., if the driver is in proximity to the vehicle), the warning controlling means 31 shifts the procedural steps to step S14 to activate the second warning means 34 of the warning issuing means 32 so that the second warning means 34 issues a warning. At that time, the warning controlling means 31 controls the second warning means 34 (the answerback means 57) so that the second warning means 34 warns of detection of an improper tire air pressure by means of an answerback (here, flashes four times) differing in manner from an answerback (here, flashes two times) during normal unlocking of the doors.

Further, the procedural step then proceeds to step S15 and the warning controlling means 31 controls the door lock controlling means 56, which consequently controls and forbids the door lock actuator 55 from unlocking the doors (i.e., to put a door unlock forbidding flag F to 1).

As shown in FIG. 4, if the flag F is set to 1 in step S20, the warning controlling means 31 judges whether or not the warning issued by the second warning means 34 is completed in step S21. If the result of the judgment is positive, the warning controlling means 31 allows the door lock controlling means 56 to release the forbidding of door unlock in step S22. If the flag is not set to 1 in step S20, the warning controlling means 31 terminates the process. If the result of the judgment as to completion of the warning is negative, the warning controlling means 31 terminates the process and returns the procedural steps to step S20.

The tire air pressure warning system of the first embodiment that is configured as described above operates continuously monitoring a tire air pressure irrespective of state of the vehicle (i.e., irrespective of whether or not the vehicle is ready for traveling and whether the engine switch of the vehicle is on or off). If the warning judging means 23 of the air pressure judging means 20 judges that a warning is required, the driver on-board judging means 40 ascertains, based on information of an IG switch serving as the traveling switch, whether or not the driver is on board the vehicle; if the IG switch is on, the warning controlling means 31 of the warning issuing means 30 activates the first warning means 33 of the warning controlling means 31 in order to issue a warning inside the vehicle because the on state of the IG switch suggests the driver is on board the vehicle. On the other hand, the off state of the IG switch indicates the driver's absence from inside the vehicle, and on the basis of the result of judgment as to whether or not a door unlock signal is received (on the basis of driver detection information) by the driver detecting means 50, reception of the door unlock signal (i.e., proximity of the driver to the vehicle) causes the warning controlling means 31 of the warning issuing means 30 to activate the second warning means 34 so that a warning is issued outside the vehicle. Here, if the door unlock signal is not received (i.e., if the driver is not in proximity to the vehicle), the warning controlling means 31 of the warning issuing means 30 terminates the procedural steps and therefore issues no warning.

Since the tire air pressure warning system of the present invention issues a warning inside or outside the vehicle in accordance with a state of the vehicle and the presence/absence of the driver inside the vehicle, it is therefore possible to properly issue a warning to the driver. Additionally, if the air pressure varies while the vehicle is parked and an improper air pressure caused by the variation is detected, the system does not unduly issue a warning to the driver when he is not in proximity to the vehicle but surely issues a warning only when the driver is in proximity to the vehicle. At this time, it is advantageously possible for the driver to recognize the warning prior to boarding the vehicle, whereupon the driver can efficiently deal with the tire having an improper air pressure (a reduced tire air pressure).

The tire air pressure warning system issues a warning using flashers serving as the answering back means 57 of the keyless entry system functioning as the driver detecting means 50. Since the system issues a warning, different in manner from a normal answerback issued when no impropriety of tire air pressure is detected, against detection of an improper tire air pressure the driver can surly recognize detection of an improper tire air pressure at the time of unlocking the doors. The system also forbids the doors to be unlocked during the warning and the doors cannot be unlocked unless the driver transmits a door unlock signal another time after the completion of the warning. Thereby the driver can notice the impropriety of tire air pressure with certainty.

The tire air pressure warning system of the present invention can be configured simply by adding functions other than that of the tire air pressure gauge 11 and the air pressure transmitting means 12 to the receiver 3 used for the keyless entry system. As a result, it is possible to realize the tire air pressure warning system at low cost.

Further, the tire air pressure warning system disposes a centrifugal switch inside each tire in addition to the tire air pressure gauge 11, the air pressure transmitting means 12 and a battery, and switches an interval of measurement of a tire air pressure between the first interval and the second interval in accordance with traveling state of the vehicle. Thereby it is possible to activate the tire air pressure gauge 11 and the air pressure transmitting means 12 at proper intervals and at the same time to suppress energy consumption, such as electricity consumption.

Further, the present invention should by no means be limited to the foregoing first embodiment, and various changes or modifications may be suggested without departing from the gist of the invention.

For example, the tire air pressure warning system of the first embodiment is arranged in the receiver 3 used in a keyless entry system serving as the driver detecting means 50 and receiving means and an arithmetic unit are shared by the tire air pressure warning system and the keyless entry system. The tire air pressure warning system may be configured separately from the receiver 3 used in the keyless entry system.

In the above-described first embodiment, the warning judging means 23 of the air pressure judging means 20 judges whether or not a warning is required on the basis of an air pressure signal (measured pressure data) stored in the memory 22. Alternatively, the tire air pressure warning system may not include the memory 22 and the warning judging means 23 may obtain an air pressure signal (measured pressure data) directly from the air pressure receiving means 21.

Further, in the first embodiment, the second warning means 34 for the tire air pressure warning system takes the form of flashers that also serve as the answering back means 57 for the keyless entry system. As an alternative, the second warning means 34 can be any part, exemplified by a horn and the headlamp, that is able to issue a warning outside the vehicle and is enough to issue a warning for the tire air pressure warning system different in manner from a normal answerback for the keyless entry system. Additionally, the second warning means 34 should by no means be common to the answering back means 57, but may be a separated form from the answering back means 57.

In the first embodiment, the warning issuing means 30 of the warning controlling means 31 determines, on the basis of the result (IG switch information) of judgment as to whether or not the vehicle is ready to move and whether the driver has boarded the vehicle for which measurement is made by the driver on-board judging means 40 and a result of detection of the driver (i.e., whether or not a door unlock signal is received) which detection is made by the driver detecting means 50, which of the first warning means 33 and the second warning means 34 is to issue a warning. Alternatively, also the first warning means 33 may issue a warning inside the vehicle when the second warning means 34 is to issue the warning. Thereby, even if the driver is on board the vehicle, the driver can notice impropriety of a tire air pressure.

Further, the first embodiment arranges a centrifugal switch inside each tire along with the tire air pressure gauge 11 and the air pressure transmitting means 12, and switches a measurement interval between the first interval and the second interval in accordance with a state of the centrifugal switch which indicates whether or not the vehicle is traveling. Alternatively, in the absence of a centrifugal switch and the tire air pressure gauge 11 and the air pressure transmitting means 12 may switch a measurement interval between the first and the second intervals in accordance with an on/off state of the IG switch.

In the tire air pressure warning system of the first embodiment, the key signal receiving means 54 used in the keyless entry system also functions as the driver detecting means 50. Alternatively, the driver detecting means 50 should by no means be limited to the key signal receiving means 54 and can be any means or device able to detect proximity of the driver to the vehicle. For example, the driver detecting means 50 may be realized by a so-called smart entry system which includes a transmitter (a key with a function for signal transmission) which automatically transmits a door lock/ unlock signal to the vehicle, without driver-operation such as that required by the operation key 51, when the driver approaches the vehicle and in which a receiver arranged on the bodywork portion receives such a key signal and the doors are locked/unlocked, a system utilizing biometrics authentication in which the driver is recognized and authenticated by a fingerprint or voice of the driver and the doors are locked/unlocked, or another system.

What is claimed is:

1. A system for warning against a tire air pressure comprising:
   air pressure measuring means for measuring a tire air pressure of a tire of a vehicle;
   air pressure judging means for judging, on the basis of the tire air pressure measured by said air pressure measuring means, whether or not the tire air pressure is proper;
   warning issuing means for issuing, if a result of the judgment by said air pressure judging means is negative, a warning;
   driver on-board judging means for judging whether or not a driver is on board the vehicle; and
   driver detecting means for detecting whether or not the driver is in the proximity to the vehicle,
   if the result of the judgment by said air pressure judging means is negative, a result of the judgment by said driver on-board judging means is negative and a result of the detection by said driver detecting means is positive, said warning issuing means issues the warning outside the vehicle.

2. A system for warning against a tire air pressure according to claim 1, wherein, if the result of the judgment by said air pressure judging means is negative and the result of the judgment by said driver on-board judging means is positive, said warning issuing means issues the warning inside the vehicle.

3. A system for warning against a tire air pressure according to claim 1, wherein said driver on-board judging means judges that the driver is not on board the vehicle when a switch for traveling of the vehicle is off and judges that the driver is on board the vehicle when the switch for traveling is on.

4. A system for warning against a tire air pressure according to claim 1, wherein
   said air pressure measuring means is provided for each tire or a wheel that supports each tire;
   said air pressure judging means is arranged on a bodywork portion of the vehicle; and
   said air pressure measuring means transmits a radio signal to said air pressure judging means to notify the tire air pressure that has been measured.

5. A system for warning against a tire air pressure according to claim 1, wherein said driver detecting means detects proximity of the driver to the vehicle upon receipt of a radio signal issued by the driver.

6. A system for warning against a tire air pressure according to claim 5, wherein
   said air pressure judging means includes air pressure receiving means for receiving the radio signal transmitted by said air pressure measuring means; and
   common receiving means is shared by said air pressure receiving means and receiving means for receiving, in said driver detecting means, the radio signal issued by the driver.

7. A system for warning against a tire air pressure according to claim 5, wherein
   the vehicle includes a keyless entry system; and
   said driver detecting means detects the proximity of the driver to the vehicle on the basis of an unlock signal used for the keyless entry system.

8. A system for warning against a tire air pressure according to claim 7, wherein:
   if the result of the judgment by said air pressure judging means is negative, a result of the judgment by said driver on-board judging means is negative and a result of the detection by said driver detecting means is positive on the basis of the unlock signal, said warning issuing means issues the warning outside the vehicle and forbids the keyless entry system to unlock doors of the vehicle on the basis of the unlock signal; and
   upon completion of the issuing of the warning, said warning issuing means releases the forbidding.

9. A system for warning against a tire air pressure according to claim 7, wherein:
   the warning issued by said warning issuing means and a normal answerback to the unlock signal for the keyless entry system are issued by common warning means; and
   the warning issued by said warning issuing means is different in manner from the normal answerback to the unlock signal.

10. A system for warning against a tire air pressure according to claim 1, wherein said air pressure measuring means measures the tire air pressure at first intervals while the vehicle is traveling and measures the tire air pressure at second intervals longer than the first intervals while the vehicle is parked.

11. A method for warning against a tire air pressure comprising the steps of:
    (a) measuring a tire air pressure of a tire of a vehicle;
    (b) judging, on the basis of the tire air pressure measured in said step (a) of measuring, whether or not the tire air pressure is proper;
    (c) judging whether or not a driver is on board the vehicle;
    (d) detecting whether or not the driver is in the proximity to the vehicle; and
    (e) if a result of said step (b) of judging is negative, issuing a warning in accordance with results of said step (c) of judging and said step (d) of detecting,
    wherein, if the result of said step (b) of judging is negative, the result of said step (c) of judging is negative and the result of said step (d) of detecting is positive, a warning is issued outside the vehicle in said step (e) of issuing.

12. A method for warning against a tire air pressure according to claim 11, wherein, if the result of said step (b) of judging is negative and the result of said step (c) of judging is positive, the warning is issued inside the vehicle in said step (e) of issuing.

13. A method for warning against a tire air pressure according to claim 11, wherein said step (c) of judging judges that the driver is not on board the vehicle when a switch for traveling of the vehicle is off and judges that the driver is on board the vehicle when the switch is on.

14. A method for warning against a tire air pressure according to claim 11, further comprising the steps of:
    issuing a radio signal including the tire air pressure that has been measured in said step (a) of measuring; and
    receiving the radio signal.

15. A method for warning against a tire air pressure according to claim 11, wherein, in said (d) of detecting, proximity of the driver is detected by receipt of a radio signal issued by the driver.

16. A method for warning against a tire air pressure according to claim 15, wherein:
   the vehicle includes a keyless entry system; and
   the proximity of the driver is detected on the basis of an unlock signal used for the keyless entry system in said step (d) of detecting.

17. A method for warning against a tire air pressure according to claim 16, wherein said step (e) of issuing comprises the sub-steps of:
   (e-1) if the result of said step (b) of judging is negative, the result of (c) of judging is negative and the result of (d) of detecting is positive on the basis of the unlock signal, issuing the warning outside the vehicle;
   (e-2) forbidding the keyless entry system to unlock doors of the vehicle on the basis of the unlock signal; and
   (e-3) upon completion of said sub-step (e-1) of issuing, releasing the forbidding of said sub-step (e-2).

18. A method for warning against a tire air pressure according to claim 16, wherein:
   the warning issued in said step (e) of issuing and a normal answerback to the unlock signal for the keyless entry system are issued in common warning means; and
   the warning issued in said step (e) of issuing is different in manner from the normal answerback to the unlock signal.

19. A method for warning against a tire air pressure according to claim 11, wherein, in said step (a) of measuring, the tire air pressure is measured at first intervals while the vehicle is traveling and is measured at second intervals longer than the first intervals while the vehicle is parked.

* * * * *